(12) United States Patent
Kim et al.

(10) Patent No.: US 12,071,526 B2
(45) Date of Patent: Aug. 27, 2024

(54) POLYAMIDE-BASED FILM, PREPARATION METHOD THEREOF, AND COVER WINDOW AND DISPLAY DEVICE COMPRISING SAME

(71) Applicant: SK microworks Co., Ltd., Gyeonggi-do (KR)

(72) Inventors: Han Jun Kim, Gyeonggi-do (KR); Jin Woo Lee, Gyeonggi-do (KR); Dae Seong Oh, Gyeonggi-do (KR); Sun Hwan Kim, Gyeonggi-do (KR); Heung Sik Kim, Gyeonggi-do (KR); Joo Young Jung, Gyeonggi-do (KR)

(73) Assignee: SK MICROWORKS CO., LTD., Gyeonggi-Do (KR)

( * ) Notice: Subject to any disclaimer, the term of this patent is extended or adjusted under 35 U.S.C. 154(b) by 289 days.

(21) Appl. No.: 17/480,396

(22) Filed: Sep. 21, 2021

(65) Prior Publication Data

US 2022/0098378 A1   Mar. 31, 2022

(30) Foreign Application Priority Data

Sep. 29, 2020 (KR) .......................... 10-2020-0127504
Sep. 29, 2020 (KR) .......................... 10-2020-0127505

(51) Int. Cl.
*C08J 5/18* (2006.01)
*G02B 1/14* (2015.01)

(52) U.S. Cl.
CPC ............. *C08J 5/18* (2013.01); *C08J 2377/06* (2013.01); *G02B 1/14* (2015.01)

(58) Field of Classification Search
CPC ...... C08J 5/18; C08J 2377/06; C08J 2379/08; C08G 69/32

See application file for complete search history.

(56) References Cited

U.S. PATENT DOCUMENTS

| 2014/0175683 A1* | 6/2014 | Harris .................. C08G 69/32 523/400 |
| 2019/0359772 A1 | 11/2019 | Kim et al. |
| 2021/0230449 A1 | 7/2021 | Park et al. |

FOREIGN PATENT DOCUMENTS

| KR | 10-2017-0105477 A | | 9/2017 |
| KR | 10-2018-0092259 A | | 8/2018 |
| KR | 20200051476 | * | 5/2020 |
| WO | 2016/033613 A1 | | 3/2016 |
| WO | 2020/085869 A1 | | 4/2020 |

OTHER PUBLICATIONS

Office Action issued by the Korean Patent Office on Jan. 14, 2022.
Office Action for the Taiwanese Patent Application No. 110133774 issued by the Taiwanese Patent Office on Oct. 21, 2022.

* cited by examiner

*Primary Examiner* — Gregory Listvoyb
(74) *Attorney, Agent, or Firm* — IP & T GROUP LLP (57) ABSTRACT

The embodiments relate to a polyamide-based film excellent in optical properties such as transmittance, haze, and yellow index and mechanical properties such as modulus and thickness uniformity, to a process for preparing the same, and to a cover window and a display device comprising the same. The polyamide-based film comprises a polyamide-based polymer and has an XRD pattern comprising a first peak whose highest point is located in a section where 2θ is 14° to 16°.

9 Claims, 3 Drawing Sheets

US 12,071,526 B2

POLYAMIDE-BASED FILM, PREPARATION METHOD THEREOF, AND COVER WINDOW AND DISPLAY DEVICE COMPRISING SAME

The present application claims priority of Korean patent application number 10-2020-0127504 filed on Sep. 29, 2020, and Korean patent application number 10-2020-0127505 filed on Sep. 29, 2020. The disclosure of each of the foregoing applications is incorporated herein in their entirety.

TECHNICAL FIELD

Embodiments relate to a polyamide-based film excellent in optical properties and mechanical properties, to a process for preparing the same, and to a cover window and a display device comprising the same.

BACKGROUND ART

Polyamide-based polymers are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyamide is used in various fields. For example, polyamide is made in the form of a powder and used as a coating for a metal or a magnetic wire. It is mixed with other additives depending on the application thereof. In addition, polyamide is used together with a fluoropolymer as a painter for decoration and corrosion prevention. It also plays a role of bonding a fluoropolymer to a metal substrate. In addition, polyamide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide has been developed in the form of a film, which is less expensive and has excellent optical, mechanical, and thermal characteristics. Such a polyamide-based film may be applied to display materials for organic light-emitting diodes (OLEDs) or liquid crystal displays (LCDs), and the like, and to antireflection films, compensation films, and retardation films if retardation properties are implemented.

When such a polyamide-based film is applied to a foldable display, a flexible display, and the like, optical properties such as transparency and colorlessness and mechanical properties such as flexibility and hardness are required. In general, however, since optical properties and mechanical properties are in a trade-off relationship, an improvement in the mechanical properties would impair the optical properties.

Accordingly, research on polyamide-based films with improved mechanical properties and optical properties is continuously required.

DETAILED DESCRIPTION OF THE INVENTION

Technical Problem

An object of the embodiments is to provide a polyamide-based film excellent in optical properties and mechanical properties, a process for preparing the same, and a cover window and a display device comprising the same.

Solution to the Problem

The polyamide-based film according to an embodiment comprises a polyamide-based polymer and has an XRD pattern in which the highest point of a first peak is located in a section where $2\theta$ is $14°$ to $16°$.

The cover window for a display device according to an embodiment comprises a polyamide-based film and a functional layer, wherein the polyamide-based film has an XRD pattern in which the highest point of a first peak is located in a section where $2\theta$ is $14°$ to $16°$.

The display device according to an embodiment comprises a display unit; and a cover window disposed on the display unit, wherein the cover window comprises a polyamide-based film and a functional layer, and the polyamide-based film has an XRD pattern in which the highest point of a first peak is located in a section where $2\theta$ is $14°$ to $16°$.

The polyamide-based film according to an embodiment comprises a polyamide-based polymer and has an XRD pattern comprising a combined peak in which a first peak having a maximum value in a section where the $2\theta$ value is $10°$ or more to less than $20°$ and a second peak having a maximum value in a section where the $2\theta$ value is $20°$ to $25°$ are combined, wherein the ratio of narrow-distanced crystals defined by the following Equation 1 is greater than 67.

$$\text{Ratio of narrow-distanced crystals} = \text{area of the second peak}/\text{area of the combined peak} \times 100 \quad \text{[Equation 1]}$$

The cover window for a display device according to an embodiment comprises a polyamide-based film and a functional layer, wherein the polyamide-based film has an XRD pattern comprising a combined peak in which a first peak having a maximum value in a section where the $2\theta$ value is $10°$ or more to less than $20°$ and a second peak having a maximum value in a section where the $2\theta$ value is $20°$ to $25°$ are combined, and the ratio of narrow-distanced crystals defined by the Equation 1 is greater than 67.

The display device according to an embodiment comprises a display unit; and a cover window disposed on the display unit, wherein the cover window comprises a polyamide-based film and a functional layer, the polyamide-based film has an XRD pattern comprising a combined peak in which a first peak having a maximum value in a section where the $2\theta$ value is $10°$ or more to less than $20°$ and a second peak having a maximum value in a section where the $2\theta$ value is $20°$ to $25°$ are combined, and the ratio of narrow-distanced crystals defined by the Equation 1 is greater than 67.

The preparation method of a polyamide-based film according to an embodiment comprises polymerizing a diamine compound and a dicarbonyl compound in an organic solvent to prepare a solution comprising a polyamide-based polymer; casting the polymer solution to prepare a gel sheet; and thermally treating the gel sheet.

Advantageous Effects of the Invention

In the polyamide-based film according to the embodiment, the location of a first peak on an XRD pattern and/or the distance between crystal planes are controlled, thereby having excellent optical properties (low yellow index, low haze, and high light transmittance) while the mechanical properties (modulus, thickness uniformity, and the like) can be enhanced.

For example, the polyamide-based polymer has the highest ratio of crystalline forms having a distance between crystal planes of 5.4 Å to 6.3 Å among various types of crystalline forms, so that the transparency is improved and the haze is reduced, and an appropriate level of viscosity is secured to facilitate the formation of a film having a uniform thickness.

In the polyamide-based film according to the embodiment, the percentage of the second peak in the combined area of a first peak and a second peak is greater than 67%. Since it comprises a large amount of narrow-distanced crystal forms, it has excellent optical properties (low yellow index, low haze, and high light transmittance) while the mechanical properties (modulus, thickness uniformity, and the like) can be enhanced.

For example, as the area of the first peak is 48% or less relative to the area of the second peak on an XRD pattern, the polyamide-based film is enhanced in transparency and reduced in haze, and an appropriate level of viscosity is secured to facilitate the formation of a film having a uniform thickness.

In addition, the polyamide-based film according to the embodiment has excellent mechanical properties and optical properties, so that it can be advantageously applied to a cover window for a display device and a foldable or flexible displace device.

EXPLANATION OF REFERENCE NUMERALS

100: polyamide-based film
101: first side
102: second side
200: functional layer
300: cover window
400: display unit
500: adhesive layer

BEST MODE FOR CARRYING OUT THE INVENTION

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expressions related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Based Film

The embodiments provide a polyamide-based film that not only is excellent in optical properties in terms of high transmittance, low haze, and low yellow index but also has excellent modulus and uniform thickness.

The polyamide-based film according to an embodiment comprises a polyamide-base polymer.

The polyamide-based film has an XRD pattern comprising a first peak whose highest point is located in a section where $2\theta$ is 14° to 16°. For example, the first peak comprises a maximum value in a section where $2\theta$ is 14° to 16°.

As used herein, the term "peak" may refer to a convex pattern (a set of intensity values) formed on an XRD pattern in a predetermined section before and after a specific point (the highest point) at which the amount of change (slope) in the intensity value changes from a positive value to a negative value.

In some embodiments, for a sample containing a crystalline component and an amorphous component, the intensity (crystalline intensity) resulting from the crystalline component may be derived by excluding the intensity (amorphous intensity) resulting from the amorphous component from the total intensity, and the peak may be determined from the crystalline component. For example, the intensity of a section (amorphous section) excluding the section (crystalline section) in which the crystalline component appears on an XRD pattern may be defined as an amorphous intensity. The amorphous intensity present in the crystalline section may be separated through the trend (e.g., in the form of an exponential function) of the amorphous intensity in the amorphous section. The amorphous intensities inside and outside the crystalline section may be connected to set a baseline, and the length (vertical height relative to the baseline) where the normal line of the baseline meets the XRD pattern may be defined as a modified intensity. The peak and highest point on the XRD pattern may be determined from the modified intensity.

As used herein, the term "maximum value" may refer to an intensity value (e.g., maximum (highest) intensity) at the highest point of a peak when the peak is present in a predetermined section of 2θ on an XRD pattern.

In such a case, the ratio of the polyamide-based polymer having a crystalline form having a specific distance between crystal planes may be increased. As a result, the optical properties and mechanical properties of the polyamide-based film may be enhanced. In some embodiments, the maximum value of a first peak may be located in a section where 2θ is 14° to 16°.

In an embodiment, the first peak may have a maximum value in a section where 2θ is 10° to 30° on an XRD graph. For example, the portion comprising the highest intensity on an XRD pattern in a section where 2θ is 10° to 30° may be defined as the first peak.

In an embodiment, the distance between crystal planes corresponding to the first peak may be 5.4 Å to 6.3 Å. For example, the distance between crystal planes may correspond to the highest point of the first peak and/or 2θ of a predetermined section encompassing the highest point. In some embodiments, the distance between crystal planes corresponding to the first peak may be 5.8 Å to 6.3 Å, 5.9 Å to 6.3 Å, or 5.9 Å to 6.2 Å.

In an embodiment, the polyamide-based polymer may comprise a plurality of crystal forms having different distances between crystal planes. In the polyamide-based polymer, the ratio of the crystal form having a distance between crystal planes within the above range among the plurality of crystal forms may be the highest.

According to exemplary embodiments, as the ratio of the polyamide-based polymer having a crystal form having a relatively long distance between crystal planes is higher since the distance between crystal planes satisfies the above range, the film formed from the polyamide-based polymer may be enhanced in optical properties such as yellow index, light transmittance, and haze and in mechanical properties such as modulus and thickness uniformity.

In an embodiment, the XRD pattern may further comprise a second peak in a section where 2θ is 20° to 25°. The ratio ($P_a/P_n$) of the maximum value ($P_a$) of the first peak to the maximum value ($P_b$) of the second peak may be 1.03 to 1.15. For example, the maximum value may be a height (absolute intensity value) from the point where the intensity is 0 to the highest point of the peak on an XRD graph. The highest point may be derived from the modified intensity.

In exemplary embodiments, if the maximum value of the first peak relative to the maximum value of the second peak satisfies the above range, the film formed from the polyamide-based polymer may be enhanced in haze, transmittance, yellow index, modulus, thickness uniformity, and the like. Preferably, $P_a/P_b$ may be 1.03 to 1.13, 1.08 to 1.15, 1.08 to 1.13, or 1.10 to 1.12.

In some embodiments, the polyamide-based film comprises at least two peaks comprising a first peak and a second peak on an XRD graph. In some embodiments, the combined peak may be composed of a combination of the first peak and the second peak.

The first peak has a maximum value in a section where the 2θ value is 10° or more to less than 20°, and the second peak has a maximum value in a section where the 2θ value is 20° to 25°. For example, the maximum value or highest point of the first peak may be located in a section where the 2θ value is 10° or more to less than 20°, and the maximum value or highest point of the second peak may be located in a section where the 2θ value is 20° to 25°.

In addition, the first peak and the second peak are combined to form a combined peak. In some embodiments, the combined peak may be located in a section where the 2θ value is 2° to 40°, preferably 5° to 35°.

As used herein, the term "peak" may refer to an XRD pattern deviating from the trend or a shape thereof when the XRD pattern outside the section where the peak is located on an XRD graph has, for example, a specific trend that can be expressed as a function.

The function may be, for example, an exponential function expressed as $y=ae^x+b$. Here, a and b may be constants.

The specific trend may be defined as a baseline on the XRD graph.

For example, the baseline may correspond to an XRD pattern of an amorphous component in the polyamide-based polymer or film, and the peak may correspond to an XRD pattern of a crystalline component.

In such a case, the peak may be defined as a portion having an intensity value greater than the baseline (a portion present above the baseline). The baseline may be provided as a base of the peak.

For example, the first peak and the second peak may correspond to various crystal forms having different distances between crystal planes.

Among crystal forms with various distances between crystal planes appearing on an XRD pattern, crystal forms having relatively wide distances between crystal planes may be defined as wide-distanced crystal forms, and crystal forms having relatively narrow distances between crystal planes may be defined as narrow-distanced crystal forms.

In some embodiments, the crystalline component corresponding to the first peak may comprise wide-distanced crystal forms having a relatively wide distance between crystal planes among crystal forms having various distances between crystal planes at a high ratio, and the crystalline component corresponding to the second peak may comprise narrow-distanced crystal forms having a relatively narrow distance between crystal planes among crystal forms having various distances between crystal planes at a high ratio.

In some embodiments, the area of the peaks may be measured.

The polyamide-based film according to an embodiment may have a ratio of narrow-distanced crystals greater than 67.

The ratio of narrow-distanced crystals may be defined as the following Equation 1.

Ratio of narrow-distanced crystals=area of the second peak/area of the combined peak×100  [Equation 1]

For example, the area (second area) of the second peak relative to the area (combined area) of the combined peak may be greater than 67%. In such a case, the polyamide-based polymer or the polyamide-based film contains the narrow-distanced crystal forms at a high ratio among the crystal forms having various distances between crystal planes contained therein, so that it is possible to improve the mechanical properties such as modulus and thickness uniformity and the optical properties such as transmittance, haze, and yellow index of the polyamide-based film. Preferably, the ratio of narrow-distanced crystals may be 69 or more, 72 or more, or 75 or more. In addition, the ratio of narrow-distanced crystals may be 90 or less, 85 or less, 80 or less, or 78 or less.

In an embodiment, the area of the combined peak may be defined as a combination of the area of the first peak and the area of the second peak.

In some embodiments, the XRD pattern of the polyamide-based film may satisfy the following Equation 2.

Area of the first peak/Area of the second peak≤48%  [Equation 2]

For example, the area (first area) of the first peak may be 48% or less relative to the second area. In such a case, the narrow-distanced crystal forms are contained at a high ratio (about twice or more) relative to the wide-distanced crystal forms, so that it is possible to improve the mechanical properties such as modulus and thickness uniformity and the optical properties such as transmittance, haze, and yellow index of the polyamide-based film. Preferably, the area of the first peak may be 45% or less, 40% or less, 35% or less, 30% or less, or 28% or less, relative to the second area. In addition, the area of the first peak may be 10% or more, 15% or more, 20% or more, 25% or more, or 26% or more, relative to the second area.

The polyamide-based film according to an embodiment may have an x-direction refractive index ($n_x$) of 1.60 to 1.70, 1.61 to 1.69, 1.62 to 1.68, 1.64 to 1.68, 1.64 to 1.66, or 1.64 to 1.65.

In addition, the polyamide-based film may have a y-direction refractive index ($n_y$) of 1.60 to 1.70, 1.61 to 1.69, 1.62 to 1.68, 1.63 to 1.68, 1.63 to 1.66, or 1.63 to 1.64.

Further, the polyamide-based film may have a z-direction refractive index ($n_z$) of 1.50 to 1.60, 1.51 to 1.59, 1.52 to 1.58, 1.53 to 1.58, 1.54 to 1.58, or 1.54 to 1.56.

If the x-direction refractive index, the y-direction refractive index, and the z-direction refractive index of the polyamide-based film are within the above ranges, when the film is applied to a display device, its visibility is excellent not only from the front but also from a lateral side, so that a wide angle of view can be achieved.

The polyamide-based film according to an embodiment may have an in-plane retardation ($R_o$) of 800 nm or less. Specifically, the in-plane retardation ($R_o$) of the polyamide-based film may be 700 nm or less, 600 nm or less, 550 nm or less, 100 nm to 800 nm, 200 nm to 800 nm, 200 nm to 700 nm, 300 nm to 700 nm, 300 nm to 600 nm, or 300 nm to 540 nm.

In addition, the polyamide-based film according to an embodiment may have a thickness direction retardation ($R_{th}$) of 5,000 nm or less. Specifically, the thickness direction retardation ($R_{th}$) of the polyamide-based film may be 4,800 nm or less, 4,700 nm or less, 4,650 nm or less, 1,000 nm to 5,000 nm, 1,500 nm to 5,000 nm, 2,000 nm to 5,000 nm, 2,500 nm to 5,000 nm, 3,000 nm to 5,000 nm, 3,500 nm to 5,000 nm, 4,000 nm to 5,000 nm, 3,000 nm to 4,800 nm, 3,000 nm to 4,700 nm, 4,000 nm to 4,700 nm, or 4,200 nm to 4,650 nm.

Here, the in-plane retardation ($R_o$) is a parameter defined by a product ($\Delta n_{xy} \times d$) of anisotropy ($\Delta n_{xy} = |n_x - n_y|$) of refractive indices of two mutually perpendicular axes on a film and the film thickness (d), which is a measure of the degree of optical isotropy and anisotropy.

In addition, the thickness direction retardation (Rn) is a parameter defined by a product of an average of the two birefringences $\Delta n_{xz}$ ($= |n_x - n_z|$) and $\Delta n_{yz}$ ($= |n_y - n_z|$) observed on a cross-section in the film thickness direction and the film thickness (d).

If the in-plane retardation and the thickness direction retardation of the polyamide-based film are within the above ranges, when the film is applied to a display device, it is possible to minimize the optical distortion and color distortion and can also minimize the light leakage from the side.

The polyamide-based film may comprise a filler in addition to the polyamide-base polymer.

The filler may have an average particle diameter of 60 nm to 180 nm. Specifically, the average particle diameter of the first filler may be 80 nm to 180 nm, 100 nm to 180 nm, 110 nm to 160 nm, 120 nm to 160 nm, or 130 nm to 150 nm, but it is not limited thereto.

If the average particle diameter of the filler is within the above range, the optical properties may not be deteriorated even when a relatively large amount thereof is employed as compared with other inorganic fillers.

The filler may have a refractive index of 1.55 to 1.75. Specifically, the refractive index of the filler may be 1.60 to 1.75, 1.60 to 1.70, 1.60 to 1.68, or 1.62 to 1.65, but it is not limited thereto.

If the refractive index of the filler satisfies the above range, the birefringence values related to $n_x$, $n_y$, and $n_z$ can be appropriately adjusted, and the luminance of the film at various angles can be improved.

On the other hand, if the refractive index of the filler is outside the above range, there may arise a problem that the filler is visually noticeable on the film or that the haze is increased due to the filler.

The content of the filler may be 100 to 3,000 ppm based on the total weight of the solids content of the polyamide-based polymer. Specifically, the content of the filler may be 100 ppm to 2,500 ppm, 100 ppm to 2,200 ppm, 200 ppm to 2,500 ppm, 200 ppm to 2,200 ppm, 250 ppm to 2,100 ppm, or 300 ppm to 2,000 ppm, based on the total weight of the solids content of the polyamide-based polymer, but it is not limited thereto.

If the content of the filler is outside the above range, the haze of the film is steeply increased, and the filler may aggregate with each other on the surface of the film, so that a feeling of foreign matter may be visually observed, or it may cause a trouble in the sliding performance or deteriorate the windability in the preparation process.

The filler may comprise, for example, silica and barium sulfate, but it is not limited thereto.

The filler may be employed in the form of particles. In addition, the surface of the filler is not subjected to special coating treatment, and it may be uniformly dispersed in the entire film.

Since the polyamide-based film comprises the filler, the film can secure a wide angle of view without a deterioration in the optical properties.

The content of residual solvents in the polyamide-based film may be 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of the residual solvents in the polyamide-based film exceeds the above range, the durability of the film may be deteriorated, and it may have an impact on the luminance.

When the polyamide-based film according to an embodiment based on a thickness of 50 μm is folded to have a radius of curvature of 3 mm, the number of folding before the fracture may be 200,000 or more.

The number of folding counts one when the film is folded to have a radius of curvature of 3 mm and then unfolded.

As the number of folding of the polyamide-based film satisfies the above range, it can be advantageously applied to a foldable display device or a flexible display device.

The polyamide-based film according to an embodiment may have a surface roughness of 0.01 μm to 0.07 μm. Specifically, the surface roughness may be 0.01 μm to 0.07 μm or 0.01 μm to 0.06 μm, but it is not limited thereto.

As the surface roughness of the polyamide-based film satisfies the above range, it may be advantageous for achieving high luminance even when the angle from the normal direction of a surface light source is increased.

The polyamide-based film according to an embodiment comprises a polyamide-based polymer, and the polyamide-based polymer may comprise an amide repeat unit and, optionally, may comprise an imide repeat unit.

In some embodiments, the polyamide-based polymer may comprise only the amide repeat unit without the imide repeat unit. In such a case, the modulus of the polyamide-based film is increased, so that it can be advantageously applied to a foldable/flexible displace device.

The polyamide-based film comprises a polyamide-based polymer, and the polyamide-based polymer may be prepared by simultaneously or sequentially reacting reactants that comprise a diamine compound and a dicarbonyl compound. Specifically, the polyamide-based polymer may be prepared by polymerizing a diamine compound and a dicarbonyl compound.

Alternatively, the polyamide-based polymer is prepared by polymerizing a diamine compound, a dianhydride compound, and a dicarbonyl compound. Here, the polyamide-based polymer may comprise an imide repeat unit derived from the polymerization of the diamine compound and the dianhydride compound and an amide repeat unit derived from the polymerization of the diamine compound and the dicarbonyl compound.

In some embodiments, the polyamide-based polymer may be polymerized without the dianhydride compound. In such a case, the polyamide-based polymer may not comprise an imide repeat unit.

The polyamide-based film according to an embodiment may comprise a polyamide-based polymer in which an amide bond is formed by the polymerization of a diamine compound and a dicarbonyl compound. The polyamide-based film may optionally comprise a polyamide-imide-based polymer in which an imide bond is formed by the further polymerization of a dianhydride compound.

In some embodiments, the polyamide-based polymer may not comprise the polyamide-imide-based polymer. In such a case, the modulus of the polyamide-based film is increased, so that it can be advantageously applied to a foldable/flexible displace device.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

H$_2$N-(E)$_e$-NH$_2$  [Formula 1]

In Formula 1,

E may be selected from a substituted or unsubstituted divalent C$_6$-C$_{30}$ aliphatic cyclic group, a substituted or unsubstituted divalent C$_4$-C$_{30}$ heteroaliphatic cyclic group, a substituted or unsubstituted divalent C$_6$-C$_{30}$ aromatic cyclic group, a substituted or unsubstituted divalent C$_4$-C$_{30}$ heteroaromatic cyclic group, a substituted or unsubstituted C$_1$-C$_{30}$ alkylene group, a substituted or unsubstituted C$_2$-C$_{30}$ alkenylene group, a substituted or unsubstituted C$_2$-C$_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

Specifically, (E)$_e$ in Formula 1 may be selected from the groups represented by the following Formulae 1-1b to 1-13b, but it is not limited thereto.

More specifically, (E)e in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such an event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

TFDB

The dicarbonyl compound is not particularly limited, but it may be, for example, a compound represented by the following Formula 3.

[Formula 3]

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in the above Formula 3 may be selected from the groups represented by the following Formulae 3-1a to 3-14a, but it is not limited thereto.

3-1a

3-2a

3-3a

3-4a

3-5a

3-6a

3-7a

3-8a

3-9a

3-10a 3-11a 3-12a

3-13a

*—(CH$_2$)$_n$—*

3-14a (n is slected from integers of 1 to 12)

Specifically, (J)$_j$ in the above Formula 3 may be selected from the groups represented by the following Formulae 3-1b to 3-8b, but it is not limited thereto.

3-1b

3-2b

3-3b 3-4b 3-5b 3-6b 3-7b

3-8b

More specifically, (J)$_j$ in Formula 3 may be the group represented by the above Formula 3-1b, the group represented by the above Formula 3-2b, the group represented by the above Formula 3-3b, or the group represented by the above Formula 3-8b.

In an embodiment, a mixture of at least two kinds of dicarbonyl compounds different from each other may be used as the dicarbonyl compound. If two or more dicarbonyl compounds are used, at least two dicarbonyl compounds in which (J)$_j$ in the above Formula 2 is selected from the groups represented by the above Formulae 3-1b to 3-8b may be used as the dicarbonyl compound.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

In an embodiment, the polyamide-based polymer may comprise two or more types of an amide-based repeat unit.

For example, the two or more types of an amide-based repeat unit may comprise a first amide-based repeat unit and a second amide-based repeat unit. The first amide-based repeat unit may be formed by reacting a first dicarbonyl compound with the diamine compound. The second amide-based repeat unit may be formed by reacting a second dicarbonyl compound with the diamine compound.

The first dicarbonyl compound and the second dicarbonyl compound may be compounds different from each other.

The first dicarbonyl compound and the second dicarbonyl compound may comprise two carbonyl groups, respectively. The angle between the two carbonyl groups contained in the first dicarbonyl compound may be greater than the angle between the two carbonyl groups contained in the second dicarbonyl compound.

In exemplary examples, the first dicarbonyl compound and the second dicarbonyl compound may be structural isomers to each other. As two kinds of dicarbonyl compounds in a structural isomeric relationship are used, a polyamide-based polymer satisfying the above distance between crystal planes can be formed, thereby enhancing the optical properties and mechanical properties of the polyamide-based polymer.

The first dicarbonyl compound and the second dicarbonyl compound may be an aromatic dicarbonyl compound, respectively.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-based polymer thus produced.

For example, the angle between the two carbonyl groups contained in the first dicarbonyl compound may be 160° to 180°, and the angle between the two carbonyl groups contained in the second dicarbonyl compound may be 80° to 140°.

For example, the dicarbonyl compound may comprise a first dicarbonyl compound and/or a second dicarbonyl compound.

For example, the first dicarbonyl compound may comprise TPC, and the second dicarbonyl compound may comprise IPC, but they are not limited thereto.

If TPC is used as the first dicarbonyl compound and IPC is used as the second dicarbonyl compound in a proper combination, a film that comprises the polyamide-based resin thus produced may have high oxidation resistance, productivity, light transmittance, transparency, and modulus, and it may have low haze.

The diamine compound and the dicarbonyl compound may be polymerized to form a repeat unit represented by the following Formula B.

[Formula B]

In Formula B, E, J, e, and j are as described above.

For example, the diamine compound and the dicarbonyl compound may be polymerized to form amide repeat units represented by the following Formulae B-1 and B-2.

[Formula B-1]

In Formula B-1, y is an integer of 1 to 400.

[Formula B-2]

In Formula B-2, y is an integer of 1 to 400.

In some embodiments, the molar ratio of the first amide-based repeat unit to the second amide-based repeat unit may be 10:90 to 79:21. As the molar ratio of the first and second amide-based repeat units is set to the above range, the distance between crystal planes of the polyamide-based polymer may be adjusted to the above range. Accordingly, it is possible to improve the physical properties such as haze, light transmittance, yellow index, and modulus of the polyamide-based film. Preferably, the molar ratio of the first amide-based repeat unit to the second amide-based repeat unit may be 25:75 to 79:21, 25:75 to 75:25, or 30:70 to 75:25.

In some embodiments, the molar ratio of the first amide-based repeat unit to the second amide-based repeat unit may be 10:90 to 90:10. As the molar ratio of the first and second amide-based repeat units is set to the above range, the distance between crystal planes of the polyamide-based polymer may be adjusted to the above range. Accordingly, it is possible to improve the physical properties such as haze, light transmittance, yellow index, and modulus of the polyamide-based film. Preferably, the molar ratio of the first amide-based repeat unit to the second amide-based repeat unit may be 25:75 to 79:21, 25:75 to 75:25, or 30:70 to 75:25.

In some embodiments, the polyamide-based film has a thickness deviation of 4 μm or less based on a thickness of 50 μm. The thickness deviation may refer to a deviation between the maximum or minimum value with respect to the average of thicknesses measured at 10 random positions of the film. In such a case, as the polyamide-based film has a uniform thickness, its optical properties and mechanical properties at each point may be uniformly exhibited.

The polyamide-based film may have a haze of 1% or less. For example, the haze may be 0.5% or less or 0.4% or less, but it is not limited thereto.

The polyamide-based film may have a transmittance of 80% or more. For example, the transmittance may be 82% or more, 85% or more, 88% or more, 89% or more, 80% to 99%, 88% to 99%, or 89% to 99%, but it is not limited thereto.

The polyamide-based film may have a yellow index of 3 or less. For example, the yellow index may be 2.5 or less or 2 or less, but it is not limited thereto.

The polyamide-based film may have a modulus of 5.0 GPa or more. Specifically, the modulus may be 5.5 GPa or more or 6.0 GPa or more, but it is not limited thereto.

The polyamide-based film may have a compressive strength of 0.4 kgf/μm or more. Specifically, the compressive strength may be 0.45 kgf/μm or more, or 0.46 kgf/μm or more, but it is not limited thereto.

When the polyamide-based film is perforated at a speed of 10 mm/min using a 2.5-mm spherical tip in a UTM compression mode, the maximum diameter (mm) of perforation including a crack may be 60 mm or less. Specifically, the maximum diameter of perforation may be 5 mm to 60 mm, 10 mm to 60 mm, 15 mm to 60 mm, 20 mm to 60 mm, 25 mm to 60 mm, or 25 mm to 58 mm, but it is not limited thereto.

The polyamide-based film may have a surface hardness of HB or higher. Specifically, the surface hardness may be H or higher, or 2H or higher, but it is not limited thereto.

The polyamide-based film may have a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The polyamide-based film may have an elongation of 15% or more. Specifically, the elongation may be 16% or more, 17% or more, or 17.5% or more, but it is not limited thereto.

The polyamide-based film according to an embodiment has excellent optical properties in terms of low haze, low yellow index, and high transmittance, as well as a uniform thickness, whereby it can have uniform and excellent optical and mechanical properties over the entire area.

The physical properties of the polyamide-based film as described above are based on a thickness of 40 μm to 60 μm. For example, the physical properties of the polyamide-based film are based on a thickness of 50 μm.

The features on the components and properties of the polyamide-based film as described above may be combined with each other.

For example, the polyamide-based film comprises a polyamide-based polymer and may have a transmittance of 80% or more, a haze of 1% or less, and a yellow index of 3 or less.

In addition, the characteristics on an XRD pattern and the properties of the polyamide-based film as described above may be the results materialized by combinations of the chemical and physical properties of the components, which constitute the polyamide-based film, along with the conditions in each step of the process for preparing the polyamide-based film as described below.

For example, the composition and content of the components that constitute the polyamide-based film, the polymerization conditions and thermal treatment conditions in the film preparation process, and the like are all combined to achieve the desired characteristics on an XRD pattern.

Cover Window for a Display Device

The cover window for a display device according to an embodiment comprises a polyamide-based film and a functional layer.

The polyamide-based film comprises a polyamide-based polymer and has an XRD pattern comprising a first peak whose highest point is located in a section where 2θ is 14° to 16°.

In some embodiments, the polyamide-based film comprises a polyamide-based polymer and has an XRD pattern comprising a combined peak in which a first peak having a maximum value in a section where the 2θ value is 10° or more to less than 20° and a second peak having a maximum value in a section where the 2θ value is 20° to 25° are combined, wherein the ratio of narrow-distanced crystals defined by the above Equation 1 is greater than 67.

Details on the polyamide-based film are as described above.

The cover window for a display device can be advantageously applied to a display device.

As the polyamide-based film has the characteristics described above in terms of the peaks on an XRD analysis pattern, the distance between crystal planes, and/or the area ratio, it may have excellent optical and mechanical properties.

Display Device

The display device according to an embodiment comprises a display unit; and a cover window disposed on the display unit, wherein the cover window comprises a polyamide-based film and a functional layer.

The polyamide-based film comprises a polyamide-based polymer and has an XRD pattern comprising a first peak whose highest point is located in a section where 2θ is 14° to 16°.

In some embodiments, the polyamide-based film comprises a polyamide-based polymer and has an XRD pattern comprising a combined peak in which a first peak having a maximum value in a section where the 2θ value is 10° or more to less than 20° and a second peak having a maximum value in a section where the 2θ value is 20° to 25° are combined, wherein the ratio of narrow-distanced crystals defined by the above Equation 1 is greater than 67.

Details on the polyamide-based film and the cover window are as described above.

Figure 1:
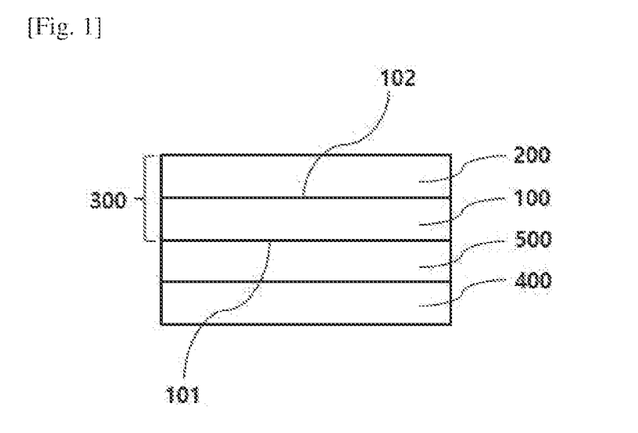
FIG. 1 is a cross-sectional view of a display device according to an embodiment.

FIG. 1 is a cross-sectional view of a display device according to an embodiment.

Specifically, FIG. 1 illustrates a display device, which comprises a display unit (400) and a cover window (300) disposed on the display unit (400), wherein the cover window comprises a polyamide-based film (100) having a first side (101) and a second side (102) and a functional layer (200), and an adhesive layer (500) is interposed between the display unit (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel may display an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) may be disposed on the display unit (400). The cover window is located at the outermost position of the display device to thereby protect the display unit.

The cover window (300) may comprise a polyamide-based film and a functional layer. The functional layer may be at least one selected from the group consisting of a hard coating, a reflectance reducing layer, an antifouling layer, and an antiglare layer. The functional layer may be coated on at least one side of the polyamide-based film.

The polyamide-based film according to an embodiment can be applied in the form of a film to the outside of a display device without changing the display driving method, the color filter inside the panel, or the laminated structure, thereby providing a display device having a uniform thickness, low haze, high transmittance, and high transparency. Since neither significant process changes nor cost increases are needed, it is advantageous in that the production costs can be reduced.

The polyamide-based film according to an embodiment may be excellent in optical properties in terms of high transmittance, low haze, and low yellow index, as well as may have a uniform thickness.

In addition, the polyamide-based film according to an embodiment can minimize the optical distortion since it has at most a certain level of in-plane retardation and a thickness direction retardation and can also reduce the light leakage from the side.

In particular, as the screen size of a display device increases, the image quality may be different for each area of the screen. However, the polyamide-based film according to embodiments has a uniform thickness and optical properties, whereby it is possible to achieve uniform image quality over the entire screen area.

Preparation Method of a Polyamide-Based Film

An embodiment provides a process for preparing a polyamide-based film.

The preparation method of a polyamide-based film according to an embodiment comprises polymerizing a diamine compound and a dicarbonyl compound in an organic solvent to prepare a solution comprising a polyamide-based polymer; casting the polymer solution and then drying it to prepare a gel sheet; and thermally treating the gel sheet.

The preparation method of a polyamide-based film according to an embodiment comprises polymerizing a diamine compound and a dicarbonyl compound in an organic solvent to prepare a solution comprising a polyamide-based polymer; charging the polymer solution into a tank; extruding and casting the solution in the tank and then drying it to prepare a gel sheet; and thermally treating the gel sheet.

Figure 2:
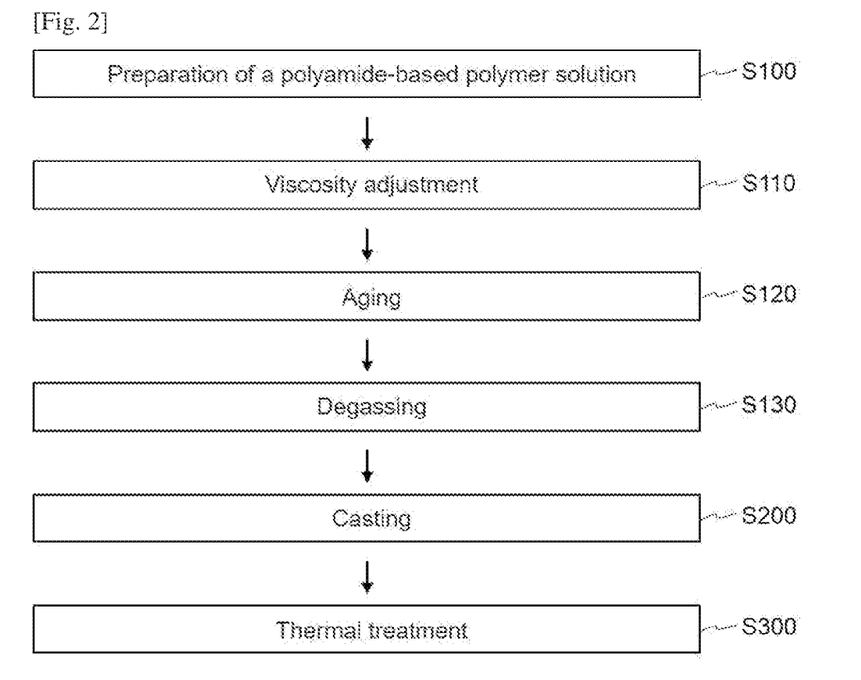
FIG. 2 is a schematic flow diagram of a process for preparing a polyamide-based film according to an embodiment.

Referring to FIG. 2, the preparation method of a polyamide-based film according to an embodiment comprises polymerizing a diamine compound and a dicarbonyl compound in an organic solvent to prepare a solution comprising a polyamide-based polymer (S100); casting the polymer solution to prepare a gel sheet (S200); and thermally treating the gel sheet (S300).

The preparation method of a polyamide-based film according to some embodiments may further comprise adjusting the viscosity of the polyamide-based polymer solution (S110), aging the polyamide-based polymer solution (S120), and/or degassing the polyamide-based polymer solution (S130).

The polyamide-based film is a film in which a polyamide-based polymer is a main component. The polyamide-based polymer is a resin that comprises an amide repeat unit as a structural unit. Optionally, the polyamide-based polymer may comprise an imide repeat unit.

In the preparation method of a polyamide-based film, the polymer solution for preparing a polyamide-based polymer may be prepared by simultaneously or sequentially mixing a diamine compound and a dicarbonyl compound in an organic solvent in a reactor, and reacting the mixture (S100).

In an embodiment, the polymer solution may be prepared by simultaneously mixing and reacting a diamine compound and a dicarbonyl compound in an organic solvent.

In another embodiment, the step of preparing the polymer solution may comprise mixing and reacting the diamine compound and the dicarbonyl compound in a solvent to produce a polyamide (PA) solution. The polyamide solution is a solution that comprises a polymer having an amide repeat unit.

In an embodiment, the step of preparing the polymer solution may be carried out by using two kinds of dicarbonyl compounds different from each other as the dicarbonyl compound. In such a case, the two kinds of dicarbonyl compounds may be mixed and reacted simultaneously or sequentially. Preferably, the first dicarbonyl compound and the diamine compound may react to form a prepolymer, and the prepolymer and the second dicarbonyl compound may react to form the polyamide-based polymer. In such an event, the XRD pattern of the polyamide-based polymer and film may be readily adjusted to the peak location, height, and/or area as described above.

The polymer contained in the polymer solution comprises an amide repeat unit derived from the polymerization of the diamine compound and the dicarbonyl compound.

Alternatively, the polymer contained in the polymer solution may comprise an imide repeat unit derived from the polymerization of the diamine compound and the dianhydride compound and an amide repeat unit derived from the polymerization of the diamine compound and the dicarbonyl compound.

In an embodiment, the step of preparing the solution comprising a polyamide-based polymer may be carried out at a temperature of −10° C. to 25° C. For example, the mixing and reaction of the solvent, the diamine compound, and the dicarbonyl compound may be carried out at a temperature of −10° C. to 25° C. If the temperature is outside the above temperature range, excessively few or many polymerization nuclei are formed, thereby making it difficult to form a polyamide-based polymer having desired properties. As a result, the location of the highest point of the first peak on an XRD pattern may be outside the section where 2θ is 14° to 16°, or the ratio of the second area to the combined area may be outside the above range. Thus, the properties such as modulus or yellow index of the polyamide-based film may be deteriorated. In addition, the viscosity of the polymer solution may be less than a predetermined range, thereby increasing the thickness deviation of a film formed therefrom. Preferably, the step of preparing the solution comprising a polyamide-based polymer may be carried out at a temperature of −20° C. to 20° C., −20° C. to 15° C., −20° C. to 10° C., −15° C. to 20° C., −15° C. to 15° C., −15° C. to 10° C., −10° C. to 20° C., −10° C. to 15° C., −10° C. to 10° C., −8° C. to 20° C., −8° C. to 15° C., −8° C. to 10° C., −5° C. to 20° C., −5° C. to 15° C., or −5° C. to 10° C.

The content of solids contained in the polymer solution may be 10% by weight to 30% by weight, but it is not limited thereto.

If the content of solids contained in the polymer solution is within the above range, a polyamide-based film can be effectively produced in the extrusion and/or casting step. In addition, the polyamide-based film thus produced may have mechanical properties in terms of an improved modulus and the like and optical properties in terms of a low yellow index and the like.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

As the pH of the polymer solution is adjusted to the above range, it is possible to prevent the occurrence of defects in the film produced from the polymer solution and to achieve the desired optical properties and mechanical properties in terms of yellow index and modulus.

The pH adjusting agent may be employed in an amount of 0.1% by mole to 10% by mole based on the total number of moles of monomers in the polymer solution.

The molar ratio of the first dicarbonyl compound to the second dicarbonyl compound for the preparation of the polymer solution may be 10:90 to 90:10 or 10:90 to 79:21, preferably, 25:75 to 79:21, 25:75 to 75:25, or 30:70 to 75:25.

As the first dicarbonyl compound and the second dicarbonyl compound are used at such a ratio, it is possible to prepare a polyamide-based polymer and a film having an XRD pattern as described above and to improve the thickness uniformity, modulus, haze, transmittance, yellow index, and the like of the polyamide-based film.

If the above range is not satisfied, such optical properties as luminance and haze may be deteriorated.

Details on the diamine compound and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

The polymer solution may be stored at −20° C. to 20° C., −20° C. to 10° C., −20° C. to 5° C., −20° C. to 0° C., or 0° C. to 10° C.

If it is stored at the above temperature, it is possible to prevent degradation of the polymer solution and to lower the moisture content to thereby prevent defects of a film produced therefrom.

In an embodiment, the process may further comprise adjusting the viscosity of the polymer solution (S110) after the step of preparing the polymer solution. The viscosity of the polymer solution may be 200,000 cps to 350,000 cps at room temperature. In such an event, the film-forming capability of a polyamide-type film can be enhanced, thereby enhancing the thickness uniformity.

Specifically, the step of preparing the polymer solution may comprise simultaneously or sequentially mixing and reacting a diamine compound and a dicarbonyl compound in an organic solvent to prepare a first polymer solution; and further adding the dicarbonyl compound to prepare a second polymer solution having the target viscosity.

In the steps of preparing the first polymer solution and the second polymer solution, the polymer solutions may have viscosities different from each other. For example, the second polymer solution may have a viscosity higher than that of the first polymer solution.

In the steps of preparing the first polymer solution and the second polymer solution, the stirring speeds may be different from each other. For example, the stirring speed when the first polymer solution is prepared may be faster than the stirring speed when the second polymer solution is prepared.

In some embodiments, the polymer solution or the polymer solution whose viscosity has been adjusted may be aged (S120).

The aging may be carried out by leaving the polymer solution at a temperature of −10° C. to 10° C. for 24 hours or longer. In such an event, the polyamide-based polymer or unreacted materials contained in the polymer solution, for example, may complete the reaction or achieve chemical equilibrium, whereby the polymer solution may be homogenized. The mechanical/optical properties of a polyamide-based film formed therefrom may be substantially uniform over the entire area of the film. Preferably, the aging may be carried out at a temperature of −5° C. to 10° C., −5° C. to 5° C., or −3° C. to 5° C.

In an embodiment, the process may further comprise degassing the polyamide-based polymer solution (S130). The step of degassing may remove moisture in the polymer solution and reduce impurities, thereby increasing the reaction yield and imparting excellent surface appearance and mechanical properties to the film finally produced.

The degassing may comprise vacuum degassing or purging with an inert gas.

The vacuum degassing may be carried out for 30 minutes to 3 hours after depressurizing the internal pressure of the tank in which the polymer solution is contained to 0.1 bar to 0.7 bar. The vacuum degassing under these conditions may reduce bubbles in the polymer solution. As a result, it is possible to prevent surface defects of the film produced therefrom and to achieve excellent optical properties such as haze.

Specifically, the purging may be carried out by purging the tank with an inert gas at an internal pressure of 1 atm to 2 atm. The purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The vacuum degassing and the purging with an inert gas may be carried out in separate steps.

For example, the step of vacuum degassing may be carried out, followed by the step of purging with an inert gas, but it is not limited thereto.

The vacuum degassing and/or the purging with an inert gas may improve the physical properties of the surface of a polyamide-based film thus produced.

Once the solution comprising a polyamide-based polymer in an organic solvent has been prepared as described above, a filler may be added to the solution.

The filler has an average particle diameter of 60 nm to 180 nm and a refractive index of 1.55 to 1.75. The content thereof is 100 ppm to 3000 ppm based on the total weight of the solids content of the polyamide-based polymer. In addition, the filler may be silica or barium sulfate.

Details on the filler are as described above.

The polymer solution may be cast to prepare a gel sheet (S200).

For example, the polymer solution may be extruded, coated, and/or dried on a support to form a gel sheet.

In addition, the casting thickness of the polymer solution may be 200 μm to 700 μm.

As the polymer solution is cast to a thickness within the above range, the final film produced after the drying and thermal treatment may have an appropriate and uniform thickness.

The polymer solution may have a viscosity of 200,000 cps to 350,000 cps at room temperature as described above. As the viscosity satisfies the above range, the polymer solution can be cast to a uniform thickness without defects, and a polyamide-based film having a substantially uniform thickness can be formed without local/partial thickness variations during drying.

The polymer solution is cast and then dried at a temperature of 60° C. to 150° C. for 5 minutes to 60 minutes to prepare a gel sheet. Specifically, the polymer solution is dried at a temperature of 70° C. to 90° C. for 15 minutes to 40 minutes to prepare a gel sheet.

The solvent of the polymer solution may be partially or totally volatilized during the drying to prepare the gel sheet.

The dried gel sheet may be thermally treated to form a polyamide-based film (S300).

The thermal treatment of the gel sheet may be carried out, for example, through a thermosetting device.

The thermosetting device may thermally treat the gel sheet through hot air.

If the thermal treatment is carried out with hot air, the heat may be uniformly supplied. If the heat is not uniformly supplied, a satisfactory surface roughness cannot be achieved, which may raise or lower the surface tension too much.

The thermal treatment of the gel sheet may be carried out in a temperature range of 60° C. to 500° C. for 5 minutes to 200 minutes. Specifically, the thermal treatment of the gel sheet may be carried out in a temperature range of 80° C. to 300° C. at a temperature elevation rate of 1.5° C./min to 20° C./min for 10 minutes to 150 minutes.

In such an event, the initial temperature of the thermal treatment of the gel sheet may be 60° C. or higher. Specifically, the initial temperature of the thermal treatment of the gel sheet may be 80° C. to 180° C.

In addition, the maximum temperature in the thermal treatment may be 300° C. to 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

According to an embodiment, the thermal treatment of the gel sheet may be carried out in two or more steps.

Specifically, the thermal treatment may comprise a first hot air treatment step carried out for 5 minutes to 30 minutes in a range of 60° C. to 120° C.; and a second hot air treatment step carried out for 10 minutes to 120 minutes in a range of 120° C. to 350° C.

The thermal treatment under these conditions may cure the gel sheet to have appropriate surface hardness and modulus and may secure high light transmittance, low haze, and an appropriate level of glossiness of the cured film at the same time.

According to an embodiment, the thermal treatment may comprise passing it through an IR heater. The thermal treatment by an IR heater may be carried out for 1 minute to 30 minutes in a temperature range of 300° C. or higher. Specifically, the thermal treatment by an IR heater may be carried out for 1 minute to 20 minutes in a temperature range of 300° C. to 500° C.

The polyamide-based film is prepared by the preparation process as described above such that it is excellent in optical properties and mechanical properties. The polyamide-based film may be applicable to various uses that require flexibility, transparency, and a certain level of luminance. For example, the polyamide-based film may be applied to solar cells, displays, semiconductor devices, sensors, and the like.

In particular, since the polyamide-based film has excellent thickness uniformity and optical properties, it can be advantageously applied to a cover window for a display device and to a display device. Since it has excellent folding characteristics, it can be advantageously applied to a foldable display device or a flexible display device.

Details on the polyamide-based film prepared by the process for preparing a polyamide-based film are as described above.

EMBODIMENTS FOR CARRYING OUT THE INVENTION

Hereinafter, the present invention will be described in more detail with reference to the following examples. However, these examples are set forth to illustrate the present invention, and the scope of the present invention is not limited thereto.

Example

Example 1

A 1-liter glass reactor equipped with a temperature-controllable double jacket was charged with 567 g of dimethylacetamide (DMAc) as an organic solvent at 10° C. under a nitrogen atmosphere. Then, 64.0 g (0.200 mole) of 2,2'-bis(trifluoromethyl)-4,4'-diaminobiphenyl (TFDB) as an aromatic diamine was slowly added thereto and dissolved.

Subsequently, terephthaloyl chloride (TPC) as a first dicarbonyl compound was slowly added, followed by stirring the mixture for 1 hour. Then, isophthaloyl chloride (IPC) as a second dicarbonyl compound was added in an amount of 94% based on the total introduced amount, followed by stirring the mixture for 1 hour, thereby preparing a first polymer solution.

And an IPC solution at 10% by weight in a DMAc organic solvent was prepared.

1 ml of the IPC solution was added to the first polymer solution, followed by stirring the mixture for 30 minutes, which procedure was repeated. About 6% of IPC based on the total introduced amount was reacted through this to prepare a second polymer solution having a viscosity of about 230,000 cps. Here, the reaction temperature was adjusted to about 10° C.

The second polymer solution was left at about 0° C. for about one day, and it was then coated onto a glass plate and dried. The dried polyamide polymer was peeled off from the glass plate and thermally treated, whereby a polyamide-based film having a thickness of 50 μm was obtained.

As to the contents of the diamine compound (TFMB) and the dicarbonyl compounds (IPC and TPC), the number of moles of the dicarbonyl compounds based on 100 moles of the diamine compound is shown in Table 1.

Examples 2 to 4 and Comparative Examples 1 to 4

Films were prepared in the same manner as in Example 1, except that the contents of the respective reactants, the polymerization temperature, and the adjusted viscosity were changed as shown in Table 1 below.

Evaluation Example

The films prepared in the Examples and Comparative Examples were each measured and evaluated for the following properties. The results are shown in Table 1 below.

Evaluation Example 1: Measurement of Film Thickness and Uniformity

The thickness was measured at 10 points on the film using a digital micrometer 547-401 manufactured by Mitutoyo Corporation, Japan. Their average value was obtained.

When it was measured at 10 points, the difference between the maximum value and the minimum value was defined as the thickness deviation. The thickness uniformity was evaluated as "good" when the thickness deviation was 4 μm or less and "poor" when the thickness deviation was greater than 4 μm.

Evaluation Example 2: Measurement of Modulus

A sample was cut out by at least 10 cm in the direction perpendicular to the main shrinkage direction of the film and by 10 cm in the main shrinkage direction. It was fixed by the clips disposed at an interval of 10 cm in a universal testing machine UTM 5566A of Instron. A stress-strain curve was obtained until the sample was fractured while it was stretched at a rate of 12.5 mm/min at room temperature. The slope of the load with respect to the initial strain on the stress-strain curve was taken as the modulus (GPa).

Evaluation Example 3: Measurement of Transmittance and Haze

The light transmittance and haze were measured using a haze meter NDH-5000W manufactured by Nippon Denshoku Kogyo in accordance with the JIS K 7105, JIS K 7136, and JIS K 7161 standards.

Evaluation Example 4: Measurement of Yellow Index

The yellow index (YI) was measured with a spectrophotometer (UltraScan PRO, Hunter Associates Laboratory) under the conditions of d65 and 10° in accordance with the ASTM-E313 standard.

Evaluation Example 5: Measurement of Viscosity

While the temperature of the polymer solution (varnish) was maintained at 10° C., it was measured using a viscometer of TOKI SANGYO's BH-II Model. The rpm was set to 4, and it was checked whether the target viscosity was achieved using spindle number 7.

Evaluation Example 6: Analysis of XRD (X-Ray Diffraction Crystallography)

The polyamide-based films according to the Examples and Comparative Examples were each subjected to an XRD analysis. Here, Ultima IV of Rigaku was used, and the analysis conditions were set as follows.

Scan source: Cu (40 kV, 30 mA)
Scan range (2-Theta): 5° to 45°
Scan size: 0.02°
Scan speed: 0.24°/sec FIGS. 3 and 4 are XRD analysis graphs (diffractograms) of the polyamide-based films of Example 3 and Comparative Example 2, respectively.

Figure 3:
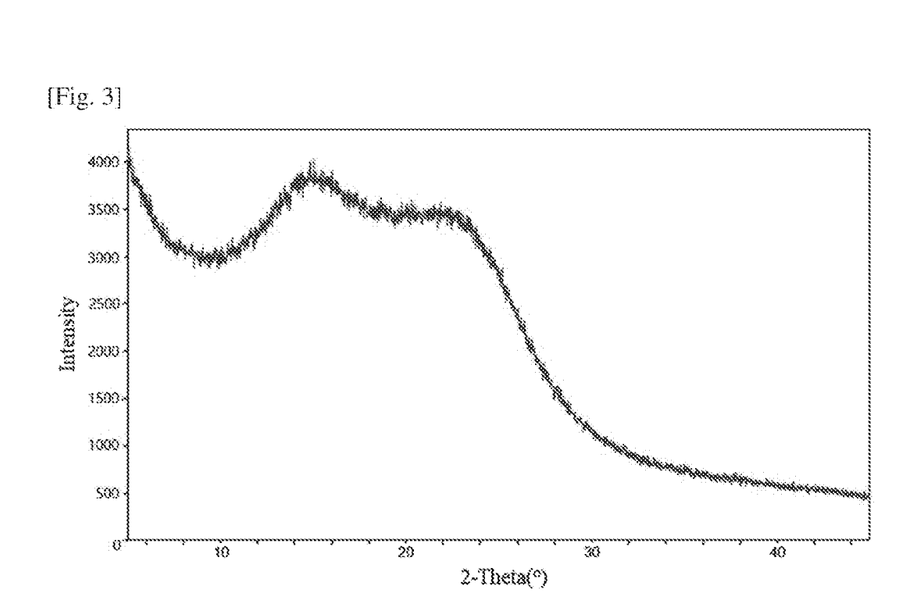
FIGS. 3 and 4 are XRD analysis graphs (diffractograms) of the polyamide-based films of Example 3 and Comparative Example 2, respectively.
Figure 4:
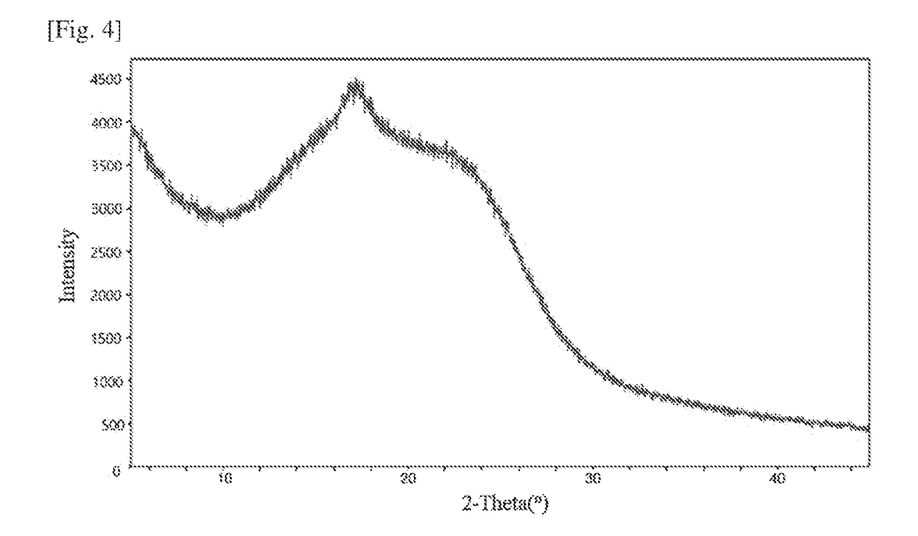

Referring to FIGS. 3 and 4, a first peak appeared in a section (first section) in which the 2θ value was 10° or more to less than 20°, and a second peak appeared in a section (the second section) in which the 2θ value was 20° to 25° on the analyzed XRD graph.

Referring to FIG. 3, in the XRD pattern of Example 3, the highest point of the first peak was observed in a section where 2θ was 14° to 16° in the first section. On the other hand, referring to FIG. 4, in the XRD pattern of Comparative Example 2, the highest point of the peak was observed at 16.7° outside the section where 2θ was 14° to 16°.

95:5, respectively, the optical properties including transmittance, haze, and yellow index were significantly deteriorated.

Example 5

1 ml of an IPC solution at 10% by weight in a DMAc solvent was added to the first polymer solution of Example 1, followed by stirring the mixture for 30 minutes, which

TABLE 1

| | | Ex. 1 | Ex. 2 | Ex. 3 | Ex. 4 | C. Ex. 1 | C. Ex. 2 | C. Ex. 3 | C. Ex. 4 |
|---|---|---|---|---|---|---|---|---|---|
| Polymerization ratio of polyamide-based film | Diamine compound | TFMB 100 | TFMB 100 | TFMB 100 | TFMB 100 | TFMB 100 | TFMB 100 | TFMB 100 | TFMB 100 |
| | Dicarbonyl compound | TPC 30 IPC 70 | TPC 50 IPC 50 | TPC 60 IPC 40 | TPC 75 IPC 25 | TPC 5 IPC 95 | TPC 80 IPC 20 | TPC 95 IPC 5 | TPC 60 IPC 40 |
| Polymerization temp. (° C.) | | 10 | 10 | 10 | 10 | 10 | 10 | 10 | 30 |
| Viscosity (×10,000 cps) | | 23 | 26 | 28 | 24 | 2 (no viscosity increase) | 20.5 | 22 | 3 (no viscosity increase) |
| Film properties | Thickness (μm) | 50 | 50 | 50 | 50 | 50 | 50 | 50 | 50 |
| | Thickness deviation (μm) | 3 | 3 | 3 | 2 | 8 | 3 | 4 | 7 |
| | Thickness uniformity | Good | Good | Good | Good | Poor | Good | Good | Poor |
| | 2-theta (°) of the highest point on XRD pattern | 14.1 | 14.4 | 14.8 | 15.2 | 13.9 | 16.7 | 16.4 | 13.8 |
| | Distance between crystal planes at the highest point (Å) | 6.27 | 6.16 | 5.97 | 5.84 | 6.36 | 5.29 | 5.39 | 6.41 |
| | Maximum value of the peak in the first section ($P_a$) | 3,993 | 4,038 | 4,025 | 3,884 | 3,862 | 4,507 | 3,921 | 3,740 |
| | Maximum value of the peak in the second section ($P_b$) | 3,537 | 3,675 | 3,590 | 3,585 | 3,224 | 3,900 | 3,319 | 3,341 |
| | $P_a/P_b$ | 1.13 | 1.10 | 1.12 | 1.08 | 1.20 | 1.16 | 1.18 | 1.12 |
| | Modulus (GPa) | 5.06 | 5.33 | 6.42 | 6.8 | 3.87 | 6.76 | 5.67 | 4.5 |
| | Transmittance (%) | 88.9 | 88.5 | 88.5 | 88.9 | 89.3 | 85.4 | 76.9 | 88.4 |
| | Haze (%) | 0.32 | 0.49 | 0.35 | 0.41 | 0.28 | 33.87 | 68.74 | 0.3 |
| | Yellow index | 1.59 | 1.75 | 1.81 | 2.72 | 3.61 | 21.99 | 31.08 | 3.4 |

As can be seen from Table 1, in the Examples in which the maximum value (the highest value) of the peak on the XRD pattern appeared in a section where 2θ was 14° to 16°, the modulus, the film-forming capability, transmittance, haze, and yellow index were excellent as compared with the Comparative Examples.

In contrast, in the Comparative Examples in which the maximum value of the peak on the XRD pattern appeared outside the section where 2θ was 14° to 16°, when the viscosity of the polymer solution was adjusted, the viscosity was not increased. Thus, it was in fact impossible to form a film having a uniform thickness, or the mechanical properties and especially the optical properties were significantly deteriorated.

Specifically, in the polyamide-based film of Comparative Example 1, in which the maximum value of the peak on the XRD pattern was located outside the range where the value was 14° to 16°, and the molar ratio of TPC:IPC was 5:95, the viscosity of the polymer solution was significantly low. Thus, the film-forming process was performed unstably, and the thickness uniformity of the film produced therefrom was deteriorated. In the polyamide-based film of Comparative Example 4 in which TFMB, TPC, and IPC were polymerized at 30° C., the viscosity of the polymer solution was significantly low, and the same problem as in Comparative Example 1 took place.

In the polyamide-based films of Comparative Examples 2 and 3 in which the molar ratio of TPC:IPC was 80:20 and procedure was repeated, whereby about 4% of IPC based on the total introduced amount was reacted to prepare a second polymer solution. Here, the viscosity of the second polymer solution was adjusted to about 230,000 cps, and the temperature during polymerization was maintained at 10° C.

The second polymer solution was coated onto a glass plate and then dried. The dried polyamide polymer was peeled off from the glass plate and thermally treated, whereby a polyamide-based film of Example 5 having a thickness of 50 μm was obtained.

As to the contents of the diamine compound (TFMB) and the dicarbonyl compounds (IPC and TPC), the number of moles of the dicarbonyl compounds based on 100 moles of the diamine compound is shown in Table 2.

Examples 6 to 9 and Comparative Examples 5 to 7

Films were prepared in the same manner as in Example 5, except that the contents of the respective reactants and the reaction temperature were changed as shown in Table 2 below.

Figure 5:
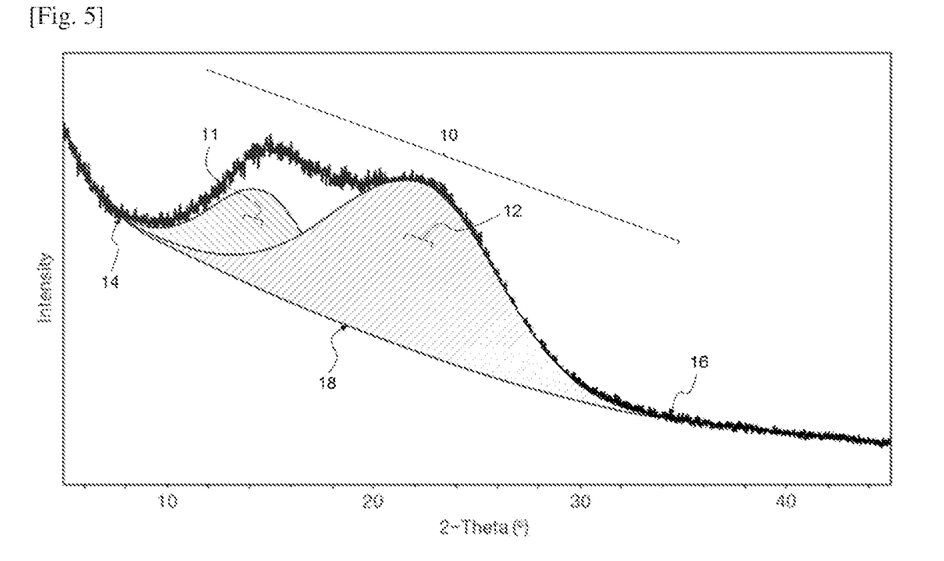
FIG. 5 is an XRD analysis graph (diffractogram) of the polyamide-based film of Example 6.

FIG. 5 is an XRD analysis graph (diffractogram) of the polyamide-based film of Example 6.

Referring to FIG. 5, a combined peak (10) in which two peaks were combined was observed in a section where the 2θ value was about 5 to 35°.

The combined peak (10) was separated into a first peak (11) and a second peak (12). The maximum value of the first peak (11) was located in a section (first section) where the 2θ value was 10 to less than 20°, and the maximum value of the second peak (12) was located in a section (second section) where the 2θ value was 20 to 25θ The combined peak (10) was separated such that the first peak (11) and the second peak (12) had the form of a Gaussian distribution with respect to the baseline (18).

The starting point (14; the point where the 2θ value was about 5°) and the ending point (15; the point where the 2θ value was about 35°) of the combined peak (10) was connected with an arbitrary line having an exponential function (e.g., y=ae$^x$+b wherein a and b are a constant). The baseline (18) was set by connecting with the XRD pattern of the section excluding the combined peak.

In the combined peak (10), the first peak (11), and the second peak (12), the area of a portion having an intensity value greater than that of the baseline (18) was analyzed using an analysis program.

Then, the ratio of narrow-distanced crystals was calculated according to the following Equation 1 and shown in Table 2 below. The percentage of the area (first area) of the first peak to the area (second area) of the second peak (12) is also shown in Table 2 below.

Ratio of narrow-distanced crystals=area of the second peak/area of the combined peak×100  [Equation 1]

TABLE 2

|  |  | Ex. 5 | Ex. 6 | Ex. 7 | Ex. 8 | Ex. 9 | C. Ex. 5 | C. Ex. 6 | C. Ex. 7 |
|---|---|---|---|---|---|---|---|---|---|
| Polymerization ratio of polyamide-based film | Diamine compound | TFMB 100 | TFMB 100 | TFMB 100 | TFMB 100 | TFMB 100 | TFMB 100 | TFMB 100 | TFMB 100 |
|  | Dicarbonyl compound | TPC 30 IPC 70 | TPC 50 IPC 50 | TPC 60 IPC 40 | TPC 70 IPC 30 | TPC 75 IPC 25 | TPC 75 IPC 25 | TPC 5 IPC 95 | TPC 95 IPC 5 |
|  | Polymerization temp. (° C.) | 10 | 10 | 10 | 10 | 10 | 30 | 10 | 10 |
| Viscosity (×10,000 cps) |  | 23 | 26 | 28 | 24.5 | 24 | 4 | 5 | 22 |
| Film properties | Thickness (μm) | 50 | 50 | 50 | 50 | 50 | 50 | 50 | 50 |
|  | Thickness uniformity | Good | Good | Good | Good | Good | Poor | Poor | Good |
|  | Ratio of narrow-distanced crystals | 80 | 78 | 75 | 69 | 72 | 65 | 62 | 67 |
|  | Percentage of first area to second area (%) | 25.4 | 27.9 | 33.2 | 44.9 | 39.1 | 53.3 | 61 | 48.3 |
|  | Modulus (GPa) | 5.1 | 5.3 | 6.4 | 6.9 | 6.8 | 5.9 | 3.9 | 5.7 |
|  | Transmittance (%) | 88.9 | 88.5 | 88.5 | 89 | 88.9 | 88.3 | 89.3 | 76.9 |
|  | Haze (%) | 0.32 | 0.5 | 0.4 | 0.4 | 0.4 | 0.5 | 0.3 | 68.7 |
|  | Yellow index | 1.6 | 2.2 | 2.4 | 2.9 | 2.7 | 3.4 | 3.6 | 31.1 |

As can be seen from Table 2, in the Examples in which the ratio of narrow-distanced crystals on the XRD graph exceeded 67, the modulus, transmittance, haze, and yellow index were excellent as compared with the Comparative Examples.

In contrast, in the Comparative Examples in which the ratio of narrow-distanced crystals on the XRD graph was 67 or less, the ratio of narrow-distanced crystals was reduced, and the yellow index, modulus, transmittance, and haze were deteriorated.

Specifically, in Comparative Example 5 in which the polyamide-based polymer was polymerized at 30° C., the viscosity of the polymer solution was lowered, making it difficult to form a film having a uniform thickness, the ratio of narrow-distanced crystals was 65, and the yellow index was increased.

In Comparative Example 6 in which the polymerization molar ratio of TPC was 5%, as the viscosity of the polymer solution did not reach the proper viscosity, it was in fact difficult to form a film uniformly, the ratio of narrow-distanced crystals was decreased, the yellow index was increased, and the modulus was decreased.

In addition, in Comparative Example 7 in which the polymerization molar ratio of TPC was 95%, the ratio of narrow-distanced crystals was 67, and the optical properties such as transmittance, haze, and yellow index were significantly deteriorated.

The invention claimed is:

1. A polyamide-based film, which comprises a polyamide-based polymer and comprises an XRD pattern including a first peak on an XRD graph, wherein the highest point of the first peak is located in a section where 2θ is 14° to 16°,
   wherein the polyamide-based polymer comprises an amide repeat unit derived from the polymerization of a diamine compound and a dicarbonyl compound, and wherein the dicarbonyl compound comprises a first dicarbonyl compound and a second dicarbonyl compound, and the molar ratio of the first dicarbonyl compound to the second dicarbonyl compound is 25:75 to 79:21.

2. The polyamide-based film of claim 1, wherein a distance between crystal planes corresponding to the first peak is 5.4 Å to 6.3 Å.

3. The polyamide-based film of claim 1, wherein the polyamide-based polymer comprises a plurality of crystal forms having different distances between crystal planes, and the ratio of the crystal form having a distance between crystal planes of 5.4 Å to 6.3 Å among the plurality of crystal forms is the highest.

4. The polyamide-based film of claim 1, wherein the XRD pattern further comprises a second peak in a section where 2θ is 20° to 25°, and the ratio ($P_a/P_b$) of a maximum value ($P_a$) of the first peak to a maximum value ($P_b$) of the second peak is 1.03 to 1.15.

5. The polyamide-based film of claim 1,
   wherein an angle between two carbonyl groups contained in the first dicarbonyl compound is greater than an angle between two carbonyl groups contained in the second dicarbonyl compound.

6. The polyamide-based film of claim 1, which, based on a thickness of the film of 50 μm, has a modulus of 5 GPa or more, a transmittance of 80% or more, a haze of 1% or less, a yellow index of 3 or less, and a thickness deviation of 4 μm or less.

7. A cover window for a display device, which comprises the polyamide-based film of claim 1; and a functional layer.

8. A display device, which comprises a display unit; and a cover window disposed on the display unit, wherein the cover window comprises the polyamide-based film of claim 1, and a functional layer.

9. A preparation method of the polyamide-based film of claim 1, which comprises polymerizing a diamine compound and a dicarbonyl compound in an organic solvent to prepare a solution comprising a polyamide-based polymer; casting the polymer solution to prepare a gel sheet; and thermally treating the gel sheet,
- wherein a step of preparing the solution comprising the polyamide-based polymer is carried out at a temperature of $-10°$ C. to $25°$ C.,
- the preparation method further comprising adjusting the viscosity of the solution to 200,000 cps to 350,000 cps after the step of preparing the solution comprising the polyamide-based polymer, and
- the preparation method further comprising aging the solution comprising the polyamide-based polymer at $-10°$ C. to $10°$ C.

* * * * *